United States Patent
Wang et al.

(10) Patent No.: US 7,667,134 B2
(45) Date of Patent: Feb. 23, 2010

(54) COMPOSITE-METAL-COMPOSITE SANDWICH HOUSING STRUCTURE

(75) Inventors: Ching-Cheng Wang, Taoyuan Hsien (TW); Yi-Chun Lin, Yungho (TW); Chao-Hung Lin, Hsinchuang (TW)

(73) Assignee: Quanta Computer Inc., Tao Yuan Shien (TW)

( * ) Notice: Subject to any disclaimer, the term of this patent is extended or adjusted under 35 U.S.C. 154(b) by 795 days.

(21) Appl. No.: 11/349,102

(22) Filed: Feb. 8, 2006

(65) Prior Publication Data
US 2007/0129119 A1 Jun. 7, 2007

(30) Foreign Application Priority Data
Dec. 5, 2005 (TW) ............... 94142827 A

(51) Int. Cl.
*H02G 3/08* (2006.01)
*H05K 5/00* (2006.01)
(52) U.S. Cl. .............. 174/50; 174/138 G; 361/809
(58) Field of Classification Search ............ 174/138 G, 174/50; 361/808, 752, 809
See application file for complete search history.

(56) References Cited

U.S. PATENT DOCUMENTS

| 6,215,667 | B1 * | 4/2001 | Ady et al. ................... 361/752 |
| 6,344,972 | B2 * | 2/2002 | Estieule et al. .............. 361/753 |
| 6,351,386 | B1 * | 2/2002 | Fischbach et al. ........... 361/704 |
| 6,501,030 | B1 * | 12/2002 | Parizi et al. ................. 174/250 |
| 6,512,174 | B2 * | 1/2003 | Mori et al. ................... 174/520 |
| 6,621,002 | B1 * | 9/2003 | Ennis et al. ................. 174/557 |
| 6,974,635 | B1 * | 12/2005 | Funamoto et al. ........... 428/609 |
| 7,212,400 | B2 * | 5/2007 | Fan et al. ............... 361/679.58 |
| 7,443,689 | B2 * | 10/2008 | Chan et al. ................... 361/730 |
| 2003/0043547 | A1 * | 3/2003 | Nealis ........................ 361/704 |
| 2004/0218375 | A1 * | 11/2004 | Fronk ......................... 361/813 |
| 2005/0111911 | A1 * | 5/2005 | Zdravkovic et al. ......... 403/283 |
| 2008/0310138 | A1 * | 12/2008 | Arends ........................ 361/808 |

* cited by examiner

*Primary Examiner*—Hung V Ngo
(74) *Attorney, Agent, or Firm*—Rabin & Berdo, PC

(57) ABSTRACT

A composite-metal-composite sandwich structure is employed as a housing of a mobile electronic device. A metal sheet is preformed as a desired shape with nuts deposed thereon. A composite sheet is attached to each side of the metal sheet, exposing the nuts such that other components of the mobile electronic device can be screwed on the sandwich structure.

6 Claims, 1 Drawing Sheet

COMPOSITE-METAL-COMPOSITE SANDWICH HOUSING STRUCTURE

RELATED APPLICATIONS

The present application is based on, and claims priority from, Taiwan Application Serial Number 94142827, filed Dec. 5, 2005, the disclosure of which is hereby incorporated by reference herein in its entirety.

BACKGROUND

1. Field of Invention

The present invention relates to a housing structure. More particularly, the present invention relates to a housing structure of a mobile electronic device.

2. Description of Related Art

The plastic housing of a mobile electronic device must protect components inside itself while not encumbering the device beyond an easily-portable weight. Therefore, plastic housings are typically made of lightweight yet mechanically strong materials. To provide greater strength, plastic materials are often reinforced with carbon or glass fibers to form composite materials.

The housing of a mobile electronic device usually has nuts deposed therein into which other components can be screwed. Nuts, however, cannot be easily buried into composite sheets due to their mechanical characteristics, thereby limiting applicability of composite materials as housings of mobile electronic devices.

SUMMARY

It is therefore an objective of the present invention to provide a composite-metal-composite sandwich structure.

In accordance with the foregoing and other objectives of the present invention, a composite-metal-composite sandwich structure is employed as a housing of a mobile electronic device. A metal sheet is preformed as a desired shape with nuts formed thereon. A composite sheet is attached to each side of the metal sheet, exposing the nuts such that other components of the mobile electronic device can be screwed on the sandwich structure.

Thus, the sandwich structure offers high mechanical strength, low thickness and light weight due to the composite material and also provides built-in nuts by the metal material so as to overcome the prior art shortcomings. Moreover, less high-cost composite material is used by the sandwich structure to further reduce manufacturing costs as compared to a wholly composite structure.

It is to be understood that both the foregoing general description and the following detailed description are by examples and are intended to provide further explanation of the invention as claimed.

BRIEF DESCRIPTION OF THE DRAWINGS

The accompanying drawing is included to provide a further understanding of the invention and is incorporated in and constitutes a part of this specification. The drawing illustrates embodiments of the invention and, together with the description, serves to explain the principles of the invention, wherein:

DESCRIPTION OF THE PREFERRED EMBODIMENTS

Figure 1:
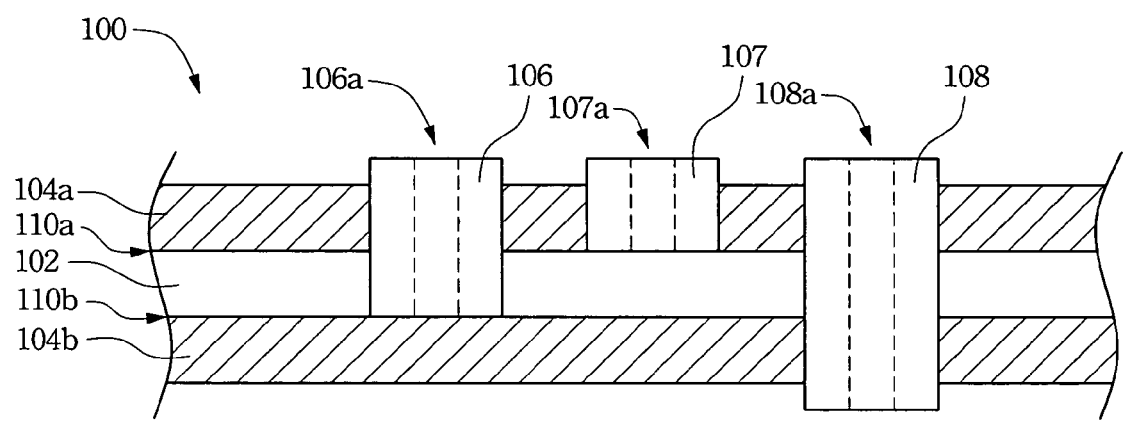
FIG. 1 illustrates a cross-sectional view of a composite-metal-composite sandwich structure according to one preferred embodiment of this invention.

Reference is now made in detail to the present preferred embodiments of the invention, an example of which is illustrated in the accompanying drawing. Wherever possible, the same reference numbers are used in the drawing and the description to refer to the same or like parts.

As described above, a composite-metal-composite sandwich structure has been provided to combine advantages of composite materials and metal materials. The composite-metal-composite sandwich structure can have nuts formed therein and have good mechanical properties.

The housings of mobile electronic devices nowadays are mainly made of metal materials. Because metal materials can be formed into complicated shapes and have nuts formed therein for easy assembly to components, they are main materials for electronic device housings. However, the primary shortcoming of a metallic housing is its relatively high density. In strengthening a metal sheet, its thickness is increased, which inevitably increases its weight.

Composite materials are noted for their good mechanical properties while having relatively low density. Thus, a composite sheet with same weight as a metal sheet has higher strength. However, nuts cannot be deposed into a composite sheet as easily as nuts can be deposed into a metal sheet. Thus, a composite-metal-composite sandwich structure is provided to combine advantages of composite materials and metal materials.

FIG. 1 illustrates a cross-sectional view of a composite-metal-composite sandwich structure according to one preferred embodiment of this invention. The sandwich structure 100 includes a metal sheet 102, composite sheets 104a/104b and nuts 106/107/108. Composite sheets 104a & 104b are attached to two opposite sides of the metal sheet 102 to strengthen it and decrease its weight. In order to easily attach composite sheets 104a & 104b to two opposite sides of the metal sheet 102, two surfaces 110a and 110b are roughened by chemical processing or powder coating.

Generally, the metal sheet 102 is preformed into a desired shape and nuts are deposed in predetermined positions. Composite sheets 104a & 104b are formed with openings corresponding to the nuts such that nuts on the metal sheet 102 can be exposed. Nuts 106 & 107 are positioned on only one side and exposed, wherein the nut 107 is mounted on the surface 110a. The nut 108 is exposed on two opposite sides of the metal sheet 102. Nuts 106/107/108 include threaded holes 106a/107a/108a for receiving bolts.

According to preferred embodiments above, an A4-sized sandwich structure 100 (wherein the aluminum sheet 102 is 0.3 mm in thickness, composite sheets 104a and 104b are both 0.15 mm in thickness, and the total thickness is 0.6 mm) has a weight of 101.5 g, which is 33.5 g less than an aluminum sheet of the same area (A4) and the same thickness (0.6 mm).

Preferred materials for the metal sheet 102 are selected from metal material with relatively low density, such as aluminum, magnesium, titanium or an alloy thereof, to meet the requirement of light weight. In order to avoid thermal weakening, the matrix material of the composite sheets 104a and 104b is selected from thermoset plastic materials. The fiber material of the composite sheets 104a and 104b is selected from carbon-fibers and glass-fibers.

According to preferred embodiments of the present invention, the sandwich structure offers high mechanical strength, low thickness and light weight due to the composite materials and built-in nuts from the metal materials so as to overcome the prior art shortcomings. Moreover, less high-cost composite sheet is used in the sandwich structure to further reduce manufacturing costs as compared to a wholly composite structure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A housing structure for a mobile electronic device, said housing structure comprising:
    a metal sheet formed into a desired shape of a housing of a mobile electronic device;
    at least one nut fixed on the metal sheet, said nut having a threaded hole; and
    two composite sheets, each being formed on a respective opposite side of the metal sheet, the threaded hole of the at least one nut being exposed through at least one of the sheets such that a bolt can be screwed into the threaded hole,
    wherein each of the two composite sheets includes a matrix material and a fiber material, and the matrix material is a thermoset material.

2. The housing structure of claim 1, wherein two opposite sides of the metal sheet are rough surfaces for attachment to the two composite sheets.

3. The housing structure of claim 1, wherein the fiber material is a carbon-fiber or a glass-fiber.

4. The housing structure of claim 1, wherein the at least one nut is disposed on one side of the metal sheet.

5. The housing structure of claim 1, wherein the at least one nut is disposed on both sides of the metal sheet.

6. The housing structure of claim 1, wherein the metal sheet is made of aluminum, magnesium, titanium or an alloy thereof.

* * * * *

UNITED STATES PATENT AND TRADEMARK OFFICE
CERTIFICATE OF CORRECTION

PATENT NO. : 7,667,134 B2 Page 1 of 1
APPLICATION NO. : 11/349102
DATED : February 23, 2010
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Seventh Day of December, 2010

David J. Kappos
*Director of the United States Patent and Trademark Office*